United States Patent

Hubby, Jr. et al.

[11] 3,998,524
[45] Dec. 21, 1976

[54] BIREFRINGENT POLARIZATION PRISM WITH A LARGE ANGULAR APERTURE

[75] Inventors: Laurence Meade Hubby, Jr., San Francisco; James Harrison Boyden, Los Altos Hills, both of Calif.

[73] Assignee: Hewlett-Packard Company, Palo Alto, Calif.

[22] Filed: Aug. 20, 1975

[21] Appl. No.: 606,625

[52] U.S. Cl. .............................. 350/157; 350/152
[51] Int. Cl.² ....................... G02B 27/28; G02B 5/30
[58] Field of Search ................... 350/152, 157–159

[56] References Cited
FOREIGN PATENTS OR APPLICATIONS 1,002,999   9/1965   United Kingdom .............. 356/157

*Primary Examiner*—John K. Corbin
*Assistant Examiner*—Wm. H. Punter
*Attorney, Agent, or Firm*—Allston L. Jones

[57] ABSTRACT

An apparatus for polarizing natural light incident on a polarizer with an intermediate layer of one birefringent or biaxial material mounted between a pair of prism substrates of a second birefringent or biaxial material with a liquid or other index matching medium between the prism substrates and the intermediate layer to provide optical coupling between the three above-mentioned constituent parts of the prism. The materials of the prism substrates and of the intermediate layer being selected to be substantially transparent and to have orthogonal indices of refraction ($n_o$ and $n_e$ for birefringent materials and any two of $n_a$, $n_b$ and $n_c$ for biaxial materials) which are considerably different for each individual material over the spectral region of the desired polarization. Further, the material of the intermediate layer is selected such that its greatest index of refraction curve is substantially equal to the lowest index of refraction curve of the material of the prism substrates over the spectral region of the desired polarization, and the optic axes of these materials are oriented in the assembled prism so that one constituent electric field component of the incident light experiences these matched indices of refraction. In addition, the liquid or other index matching medium is selected to have an index of refraction which is also substantially equal to the two matched indices of the prism materials. The single intermediate layer may be replaced with a sandwich of a plurality of intermediate layers. The composition of the plurality of intermediate layers alternates between the first and second birefringent or biaxial material with the outer layers being constructed from the second birefringent or biaxial material. In addition, the liquid or other index matching medium is used between each of this plurality of intermediate layers to provide optical coupling between each layer and the prism substrates. This prism configuration with a single or plurality of intermediate layers and the technique for choosing the prism materials provides the large angular aperture and, with the proper choice of materials, is operable substantially over the infrared, visible and ultraviolet spectrums.

9 Claims, 4 Drawing Figures

BIREFRINGENT POLARIZATION PRISM WITH A LARGE ANGULAR APERTURE

BACKGROUND OF THE INVENTION

This invention relates to polarization prisms, and, more particularly, to polarization prisms that are constructed from birefringent or biaxial materials.

In the prior art, there are basically four techniques for polarizing a natural beam of light. These techniques employ either Brewster's angle plates, a pair of prisms with or without an intermediate layer which may be constructed from a birefringent or biaxial material, dichroic materials such as "polaroid," and wire grids or conductive gratings.

The Brewsters's angle plate polarizers require the use of a stack of closely ground and polished transparent plates canted at the complement of Brewster's angle to the direction of travel of the incident light. Polarizers of this type may be constructed for use in the transmission mode, reflection mode, or both. In the transmission mode, light of the unwanted polarization is removed from the beam by preferential reflection at the canted surfaces, while the desired polarization is transmitted. In the reflection mode, the reflected beam of light is taken as the desired output, while the transmitted light is regarded as unwanted and disposed of by absorption or other means. It is also possible to use this type of polarizer as a beamsplitting polarizer, the reflected light being predominantly of one polarization and the transmitted light being predominantly of the other. There are difficulties associated with each mode of operation of this type of polarizer, all of which stem from the fact that only for light incident on a surface at precisely Brewster's angle is the reflected beam entirely of one polarization and that even then only 20–30% of this one polarization is reflected with the balance being transmitted. In the transmission mode the 70–80% of the above-mentioned polarization which is transmitted is undesired, and many surfaces must typically be cascaded in order to obtain a device with usably high rejection of the undesired polarization. This requirement for a multiplicity of surfaces increases the size and cost of such a polarizer and creates additional problems in the ultraviolet portion of the spectrum, where few materials are entirely without absorption and requirements on quality of surface finish in order to avoid light loss and depolarization due to scatter are more severe than they are at longer wavelengths. In the reflection mode, the lack of purity of the polarization of the reflected beam for angles of incidence other than precisely Brewster's angle severely restricts the usable angular aperture of such a device. Furthermore, since only 20–30% of the desired polarization is reflected by a single surface, the throughput of such a polarizer is quite low unless many surfaces are cascaded, as in the case of transmission mode operation. In addition to the difficulties created by such a multiplicity of surfaces in the transmission mode case, the further difficulty then arises that the spaces between the surfaces (i.e., the thickness of the plates and the spaces between them) must be very small in order that the output beam not be distorted by elongation or "smearing."

The second polarization technique utilizes birefringent material in one of several prism types. One type utilizes a polarization prism that polarizes the incident light by total internal reflection of one of the two electric field components of the incident light at an interior surface which is canted to the incident light at or beyond a selected critical angle. A second type utilizes a polarization prism which transmits both electric field components of the incident light physically separating them from each other at the output of the polarization prism.

Several techniques have been utilized in the prior art to construct a polarization prism using the first of the above birefringent prism types. One widely used technique for implementing this type of polarization prism is to cut one or more calcite crystals to form a Nicol or a Glan Thompson type prism. The resultant prism parts are then "cemented" together with Canada balsam, oil, or other cement with an appropriate index of refraction. Another implementation of the calcite polarizer is to "cement" a layer of calcite between two glass prisms. The use of a calcite polarizer for broadband applications is undesirable because calcite is fragile, generally difficult to polish, is very expensive, and does not readily transmit ultraviolet light in the 2000A wavelength region. In addition, the "cements" used in the construction of these, and similar polarizers of the prior art, tend to discolor and dry out with age, and do not readily transmit ultraviolet light.

Other techniques of producing the first type of birefringent polarization prisms include trying to grow a birefringent crystal between two prism faces, replacement of the non-birefringent prisms with liquids of a selected refractive index, and by grinding and polishing the mating surfaces of the prisms and a central layer of a birefringent material so that the surfaces match to an accuracy of within 1/10 of a wavelength of the shortest wavelength light to be polarized, thus requiring no cement to assemble these polarization prisms. The technique of growing the birefringent crystal between the two prisms presents problems in maintaining the proper orientation of the crystalline optic axis during growth of the crystal, and in the minimization of the residual strain in the crystal after cooling. The effect of the residual strain is a reduction in the crossout (i.e., percent polarization of the incident light), thus limiting the optical quality of the polarization prism. Typical problems with the liquid prisms are the need for ancillary devices for the liquid, the fluctuation of the refraction of the liquid with age as a result of evaporation and other characteristic changes, and the lack of the transmissibility of ultraviolet light through these liquids. Also, while the technique of closely grinding and polishing the mating surfaces of the materials is a viable solution of many of the problems introduced by the cement techniques for visible light, it is not for ultraviolet light. The wavelength of ultraviolet light is on the order of one half to one quarter that of visible light wavelengths, thus, the technique of closely grinding and polishing the mating prism surfaces would necessitate grinding and polishing those surfaces to a tolerance which is one half to one quarter the necessary tolerance for visible light. These smaller tolerances greatly increase the cost of the prism and may be unachievable with relatively soft prism materials.

The second type of birefringent polarization prisms are the Wollaston and Rochon shearing type polarizers. These polarizers produce two plane polarized, orthogonal light beams with an angular separation between them at the same output surface of the polarization prism. Thus, it is necessary to use a mechanical obstruction to eliminate one of the two light beams. In addition, the Wollaston polarizer disperses both polarizations of the incident light, and the Rochon polarizer yields only one half the angular separation of the polarized light beams of the Wollaston polarizer. Further, these shearing type polarizers are also subject to the same material limitations as the Glan Thompson and Nichol type prisms. Therefore, the usefulness of this type of polarizer is limited in many applications.

The third polarization technique typically utilizes a thin layer of tiny needlelike dichoric crystals of herapathite, in parallel orientation, embedded in a plastic matrix and enclosed for protection between two transparent plates. Polarization with this technique is limited to narrow band applications, provides incomplete polarization, and has a high transmission loss.

The phenomenon of the fourth polarization technique utilizes a conductive grating or wire grid, where the spacing between the conductive elements is less than the wavelength of the highest frequency light component of the incident light beam. This technique has been used for a number of years and is more fully described in U.S. Pat. No. 3,536,373 and in the paper Bird, G. R. and Parrish, M., Jr., "The Wire Grid as a Near-Infrared Polarizer," Journal of the Optical Society of America, Vol. 50, No. 9, pp. 886–891, Sept. 1960. Wire grid polarizers have been used successfully into the infrared region, but their use at higher frequencies is limited by the fineness of the required wires and the small spacing between those wires which cannot be produced with the present state of the art.

SUMMARY OF THE INVENTION

In accordance with the illustrated embodiment, the present invention provides a polarization prism including a pair of prism substances constructed from a first birefringent or biaxial material, an intermediate layer constructed from a second birefringent or biaxial material mounted between the pair of prism substrates, and a liquid or other index matching medium between the prism substrates and the intermediate layer to provide optical coupling between these three prism elements.

All of the prism materials are selected to be substantially transparent over a selected portion or all of the infrared, visible and ultraviolet spectra where polarization is desired. To provide a large angular aperture through which polarization of the incident light is complete, the two birefringent or biaxial materials are selected so that there is a large difference between the orthogonal indices of refraction of the individual materials and so that the greatest and least index of refraction curves of the second and the first birefringent or biaxial materials, respectively, are substantially matched over the spectral region of the desired polarization.

This matching of the indices of refraction is accomplished physically by cutting the materials so that their optic axes are oriented in such a way that a desired electric field component of the incident light is transmitted through the prism without experiencing any substantial change in the index of refraction, while a second orthogonal electric field component of the incident light experiences a broad variation of the indices of refraction and therefore experiences total internal reflection. Further, by matching the index of refraction of the index matching medium to the matched indices of the first and second birefringent or biaxial materials, the angular aperture and the high transmissibility of the desired polarization of the prism are preserved.

To increase the degree of polarization while maintaining the large angular aperture and with only a small loss in the transmissibility of the prism, the single intermediate layer can be replaced with a plurality of intermediate layers, with the optical coupling index matching medium between each layer. This plurality of intermediate layers is constructed with alternate layers of the first and second birefringent or biaxial materials with the two outer layers being constructed from the second birefrigent or biaxial material.

One embodiment of the invention employs ammonium dihydrogen phosphate (A.D.P) for the prism substrates, potassium pentaborate for the intermediate layer, and decahydronaphthalene for the optical index matching medium. The optic axis of the prism substrates and the intermediate layer are oriented in such a way that the electric field component of the incident light to be transmitted enters the A.D.P. as an extraordinary ray. This configuration and the matching of the indices of refraction provide a polarization prism with an angular aperture of substantially 14°, and good transmission of infrared, visible, and ultraviolet light that is relatively undeviated through the prism.

A second embodiment of the invention includes crystalline quartz prism substrates, a potassium pentaborate intermediate layer, and a decahydronaphthalene index matching medium. Orientation of the optic axes of the prism substrates and the intermediate layer are such that the electric field component of the incident light to be transmitted through the prism enters the first quartz prism substrate as an ordinary ray. This configuration and the matching of the indices of refraction provide a polarization prism with an angular aperture of substantially 7.5°, good transmission of infrared, visible, and ultraviolet light, and a transmitted polarized light wave that is not significantly dispersed or angularly offset.

DESCRIPTION OF THE PREFERRED EMBODIMENT

Figure 1:
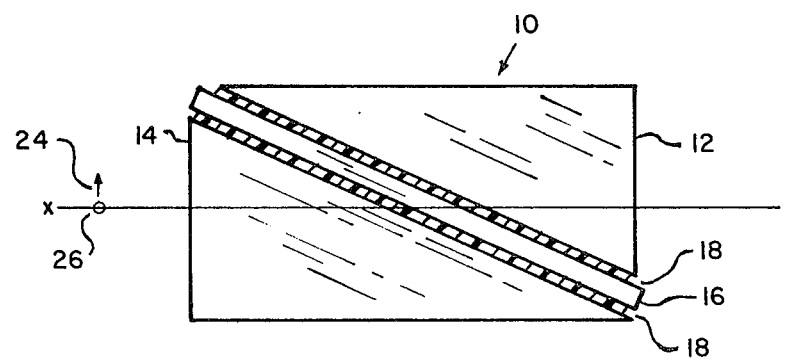
FIG. 1 is a side view of the polarization prism of the preferred embodiment of the present invention.
Figure 2:
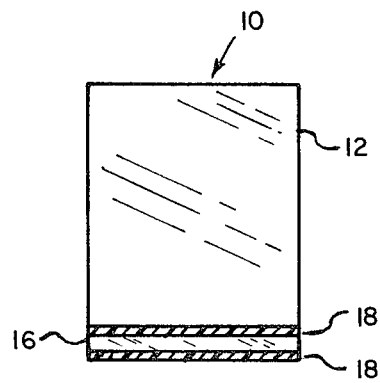
FIG. 2 is an end view of the polarization prism of the preferred embodiment of the present invention.

With reference to FIGS. 1 and 2, there is shown a polarization prism 10 that includes prism substrates 12 and 14, an intermediate layer 16 mounted between and adjacent to prism substrates 12 and 14, and a selected liquid or other index matching medium 18 for providing optical coupling between the intermediate layer 16 and the prism substrates 12 and 14. Index matching medium 18 also provides a closely matched index of refraction transition between each of the prism substrates 12 and 14 and the intermediate layer 16 for the electric field component of the incident light that is to be transmitted through the polarizer.

Prism substrates 12 and 14 are made from a first type of relatively strain-free birefringent or biaxial material, and the intermediate layer 16 is made from a second type of selected relatively strain-free birefringent or biaxial material. Both types of birefringent or biaxial material are selected for transparency and substantial birefringency (i.e., a substantial difference between the orthogonal indices of refraction) over the spectral region where the polarizer is to be used, and to be relatively strain-free to minimize the degradation of the crossout (i.e., degree of polarization) caused by the strain-induced birefringence in the material. Also, the two different birefringent or biaxial materials are selected to maximize the angular aperture for a high ratio of separation of the two polarizations of the incident natural light.

Figure 3:
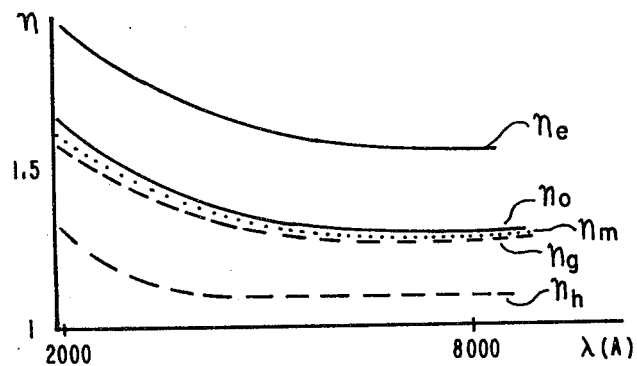
FIG. 3 is a sample graph of the matching of the indices of refraction of the prism substrates, intermediate layer, and optical index matching medium.

Typically, the wave front of the incident light travels along axis $x$ with the electromagnetic components of that light depicted by component electric field waves 24 and 26. One of the two waves 24 and 26 will be transmitted through polarization prism 10 along axis $x$, while the other component wave experiences total internal reflection at the first surface of the intermediate layer 16. In the example of FIG. 3, if the prism substrates 12 and 14 are constructed from a birefrigent material with indices of refraction $n_e$ and $n_o$, the intermediate layer 16 is constructed from a birefringent material with indices of refraction $n_g$ and $n_h$, and the index matching medium 18 is selected to have an index of refraction $n_m$, with the optic axes of the prism substrates 12 and 14 and the intermediate layer 16 oriented so that one of the waves 24 and 26 experiences an $n_o - n_m - n_g - n_m - n_o$ transition, while the other wave experiences an $n_e - n_m - n_h - n_m - n_e$ transition, the first wave will be transmitted through the polarizer with very little deviation and the second wave will be totally reflected either at the first transition to the index matching medium 18 or the intermediate layer 16 if the incident light strikes those transitions within the angular aperture of the polarizer. It should be noted that the angular aperture where total internal reflection of one of the two waves 24 and 26 occurs can be maximized by selecting the two materials such that the difference between $n_e$ and $n_h$ is maximized while minimizing the difference between $n_o$ and $n_g$. When the difference between $n_o$ and $n_g$ is very small compared to the difference between $n_e$ and $n_h$, the change in the indices of refraction experienced by the internally reflected incident light wave approaches the sum of the differences of the indices of refraction of each of the materials (i.e., $n_e - n_h \approx (n_e - n_o) + (n_g - n_h)$) which can be described as the addition of birefringences. Further, the angular aperture of polarizer 10 is maximized as the quantity $|\sin^{-1}(n_3/n_e) - \sin^{-1}(n_4/n_0)|$ is maximized where $n_3$ is the lesser of $n_h$ or $n_m$ and $n_4$ is the lesser of $n_g$ or $n_m$. While the selection of $n_m$ shown in FIG. 3 is optimum, $n_m$ may be slightly greater than $n_o$ with no loss in angular aperture or slightly less than $n_g$ with only a small loss in the angular aperture of the polarizer 10.

Figure 4:
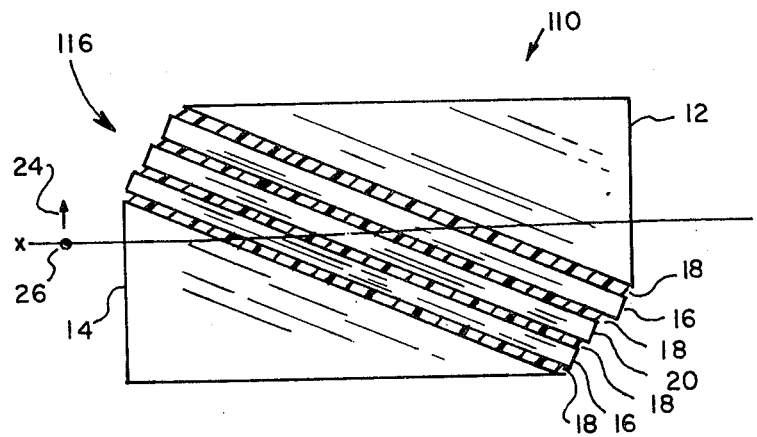
FIG. 4 is a side view of the polarization prism of a generalized form of the preferred embodiment of the present invention.

FIG. 4 illustrates a polarization prism 110 that includes the prism substrates 12 and 14 of the first birefringent or biaxial material, a plurality of intermediate layers 116 mounted between and adjacent to prism substrates 12 and 14, and the index matching medium 18 to provide optical coupling between the prism substrates 12 and 14 and the adjacent plurality of intermediate layers 116. To provide the same type of operation as polarization prism 10 in FIGS. 1 ad 2, the plurality of intermediate layers 116 are constructed from alternate layers of the first (20) and second (16) birefringent or biaxial materials introduced earlier with the two outer layers being constructed from the second birefringent or biaxial material. By utilizing this configuration for the polarization prism, the percentage polarization of the incident light is increased, and the large angular aperture is maintained with only a small increase in the deviation of the output polarization and a small loss in the relative transparency of the polarization prism 110.

In the two embodiments of this invention given below the materials which are employed permit good light transmission in the infrared, visible, and ultraviolet spectral regions, provide an angular aperture of at least 7° which remains substantially symmetric with respect to a fixed direction of the transmitted light since the dispersions of all the materials substantially track with variations in the light wavelength, and provide a high ratio of separation of the two waves 24 and 26 of the incident light.

One of the preferred embodiments of the present invention uses the birefringent material ammonium di-hydrogen phosphate (A.D.P.) for prism substrates 12 and 14, the biaxial material potassium pentaborate for the intermediate layer 16, and decahydronaphthalene for the optical index matching medium 18. In this embodiment, the optic axis of the A.D.P. prism substrates 12 and 14 is oriented normal to the axis and in the plane of FIG. 1 so that wave 26 enters prism substrate 14 as an ordinary ray experiencing the refractive index $n_o$ of the A.D.P. At the first interface of the wave 26 with the index matching medium 18 or of the intermediate layer 16, wave 26 experiences total internal reflection due to the change in the index of refraction and the angle of incidence at the interface within an angular aperture of approximately 14°. A.D.P. is a negative birefringent material ($n_o > n_e$) with the greatest index of refraction curve of the biaxial potassium pentaborate matching $n_e$ of the A.D.P. by selective orientation of the optic axes of the two materials. Wave 24 enters the first A.D.P. prism substrate 14 as an extraordinary ray that experiences index $n_e$. At all material interfraces, wave 24 is substantially transmitted with very little reflection since the changes in the indices of refraction experienced by wave 24 are sufficiently small. As a result of the symmetric structure of this polarization prism 10 and the close match of the indices of refraction of the A.D.P., the potassium pentaborate, and the decahydronaphthalene, the electric wave 24 is substantially undeviated by refraction during transmission through the polarization prism 10.

A second embodiment of the present invention utilizes crystalline quartz for prism substrates 12 and 14, potassium pentaborate for the intermediate layer 16, and decahydronaphthalene for the optical index matching medium 18. The optic axes of the crystalline quartz prism substrates 12 and 14 are oriented normal to the $x$-axis and the plane of FIG. 1 so that wave 26 enters prism substrate 14 as an extraordinary ray experiencing the refractive index $n_e$ of the crystalline quartz. At the first interface of the wave 26 with the index matching medium 18 or the intermediate layer 16, wave 26 experiences total internal reflection. This total internal reflection is the result of the change in the index of refraction and the angle of incidence at the interface within an angular aperture of approximately 7.5°. Crystalline quartz is a positive birefringent material ($n_e > n_o$) with the upper index of refraction curve of the biaxial potassium pentaborate approximately matching $n_o$ of the crystalline quartz by selective orientation of the optic axes of the two materials. Wave 24 enters prism substrate 14 as an ordinary ray which experiences index $n_o$. At all material interfaces, wave 24 is substantially transmitted since the changes in the indices of refraction experienced by wave 24 are sufficiently small. Wave 24 is offset by a small amount from axis $x$ during transmission through the polarization prism 10 as a function of the wavelength of the incident light; however, the symmetry of the polarization prism 10 ensures that the transmitted wave 24 will not experience angular offset nor be substantially dispersed.

We claim:

1. A polarization prism for polarizing incident light, said prism comprising:
   a pair of prism substrates each of a first relatively strain-free material with a plurality of indices of refraction;
   an intermediate layer of a second relatively strain-free material with a plurality of indices of refraction, said intermediate layer being disposed between and spaced apart from the pair of prism substrates; and
   an index matching medium disposed between the intermediate layer and each of the pair of prism substrates for providing optical coupling therebetween;
   said first and second relatively strain-free materials, and said index matching medium each being selected to substantially match the lesser index of refraction curve of the first relatively strain-free material with the greater index of refraction curve of the second relatively strain-free material and the index of refraction curve of the index matching medium, said prism substrates and intermediate layer having the respective optic axes of the two materials aligned for providing a transmission path with a substantially constant index of refraction therealong to a selected polarization component of the incident light.

2. A polarization prism as in claim 1 wherein said prism substrates, intermediate layer and index matching medium are substantially transparent over at least a selected portion of the infrared, visible, and ultraviolet spectral regions.

3. A polarization prism as in claim 2 wherein said first and second relatively strain-free materials are each selected to have a substantial difference between the orthogonal indices of refraction thereof for providing a large angular aperture through which the incident wave of light is polarized.

4. The polarization prism as in claim 3 wherein said first substantially strain-free material of said pair of prism substrates comprises ammonium di-hydrogen phosphate.

5. The polarization prism as in claim 3 wherein said first substantially strain-free material of said pair of prism substrates comprises crystalline quartz.

6. The polarization prism as in claim 3 wherein said index matching medium comprises decahydronaphthalene.

7. The polarization prism as in claim 3 wherein said second substantially strain-free material of said intermediate layer comprises potassium pentaborate.

8. The polarization prism as in claim 4 wherein said second substantially strain-free material of said intermediate layer comprises potassium pentaborate.

9. A polarization prism for polarizing incident light, said prism comprising:
   a pair of prism substrates of a first relatively strain-free material with a plurality of indices of refraction;
   a plurality of intermediate layers being disposed between said pair of prism substrates and spaced apart from each other layer and said prism substrates, said intermediate layers being alternately constructed from a second relatively strain-free material and said first relatively strain-free material each with a plurality of indices of refraction and with the two outer layers of said plurality of intermediate layers being constructed from said second relatively strain-free birefringent material; and
   an index matching medium disposed between each of said plurality of intermediate layers and said pair of prism substrates for providing optical coupling therebetween.

* * * * *

UNITED STATES PATENT AND TRADEMARK OFFICE
CERTIFICATE OF CORRECTION

PATENT NO. : 3,998,524
DATED : December 21, 1976
INVENTOR(S) : Laurence M. Hubby, Jr. and James H. Boyden It is certified that error appears in the above-identified patent and that said Letters Patent are hereby corrected as shown below:

Column 2, line 44, after "fluctuation of the" insert -- index of --.

Signed and Sealed this

Eighth Day of March 1977

[SEAL]

Attest:

RUTH C. MASON
Attesting Officer

C. MARSHALL DANN
Commissioner of Patents and Trademarks